(12) United States Patent
Hamada et al.

(10) Patent No.: US 6,980,794 B1
(45) Date of Patent: Dec. 27, 2005

(54) COMMUNICATION APPARATUS

(75) Inventors: Masashi Hamada, Tokyo (JP);
Kazuhide Nagamine, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/459,037

(22) Filed: Dec. 10, 1999

(30) Foreign Application Priority Data

Dec. 21, 1998 (JP) .................................. 10-375884

(51) Int. Cl.$^7$ .......................................... H04M 11/00
(52) U.S. Cl. .................... 455/407; 455/406; 455/432.1
(58) Field of Search ............................ 455/406, 407, 455/408, 409, 432, 434, 445

(56) References Cited

U.S. PATENT DOCUMENTS

| | | | |
|---|---|---|---|
| 5,392,340 A | 2/1995 | Otsuka | |
| 5,732,132 A | 3/1998 | Hamada | |
| 5,771,457 A | 6/1998 | Tsutsui | |
| 5,862,471 A * | 1/1999 | Tiedemann, Jr. et al. ... | 455/406 |
| 5,881,105 A | 3/1999 | Balachandran et al. | |
| 5,915,214 A * | 6/1999 | Reece et al. ................ | 455/406 |
| 5,974,308 A * | 10/1999 | Vedel .......................... | 455/407 |
| 6,016,427 A * | 1/2000 | Barber et al. ............... | 455/434 |
| 6,018,652 A * | 1/2000 | Frager et al. ............... | 455/406 |
| 6,138,006 A * | 10/2000 | Foti ............................ | 455/414 |
| 6,195,543 B1 * | 2/2001 | Granberg .................... | 455/407 |
| 6,324,404 B1 * | 11/2001 | Dennison et al. ........... | 455/456 |
| 6,408,174 B1 * | 6/2002 | Steijer ........................ | 455/407 |

FOREIGN PATENT DOCUMENTS

| | | |
|---|---|---|
| EP | 0 504 795 A2 | 9/1992 |
| EP | 0 526 118 A2 | 2/1993 |
| EP | 0 597 638 A1 | 5/1994 |
| EP | 0 647 055 A1 | 4/1995 |
| EP | 0 734 144 A2 | 9/1996 |
| GB | 2 324 226 A | 10/1998 |
| JP | 4-290097 | 10/1992 |
| JP | 5-191343 | 7/1993 |
| WO | WO 96/24226 | 8/1996 |
| WO | WO 98/52344 | 11/1998 |
| WO | WO 99/16265 | 4/1999 |

OTHER PUBLICATIONS

U.S. Appl. No. 08/428,045, filed Apr. 15, 1995, Kikuchi et al.
U.S. Appl. No. 08/147,400, filed Nov. 5, 1993, Tsutsui et al.
European Search Report and Annex thereto for EP Application No. 99403198.7-1246, Date of Completion of Search—Oct. 27, 2004.

* cited by examiner

*Primary Examiner*—Temica Beamer
(74) *Attorney, Agent, or Firm*—Morgan & Finnegan, L.L.P.

(57) ABSTRACT

A radio network transmits network information to a radio terminal when the position of the radio terminal is registered. If the network information has changed when the radio terminal places an outgoing call or receives an incoming call, the radio network transmits network information after the change. The network information includes information identifying a network used to make a connection to another network, and information relating to communication charges. The radio terminal calculates communication charges using the network information.

6 Claims, 13 Drawing Sheets

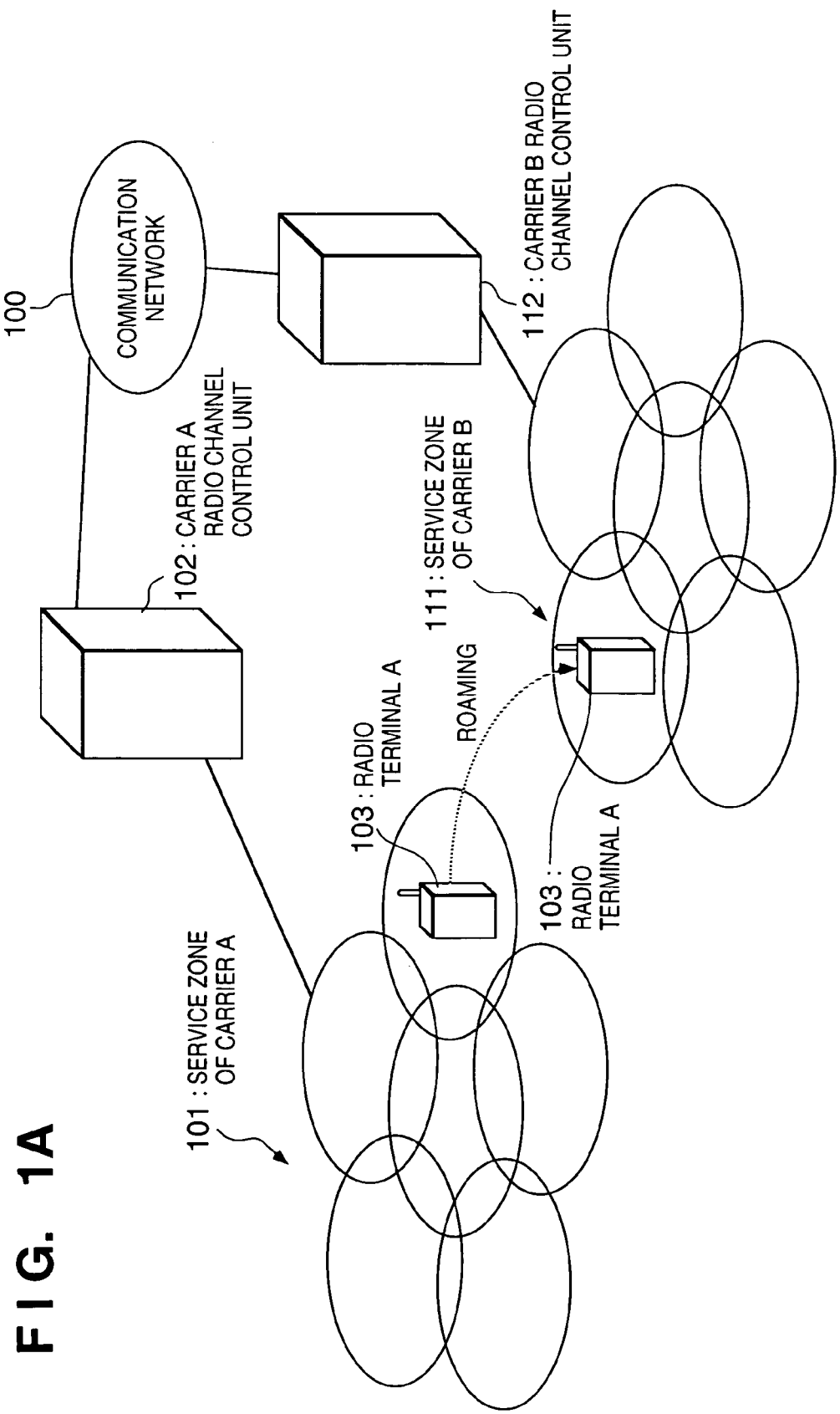

FIG. 7

| START OF COMMUNICATION | END OF COMMUNICATION | ZONE POSITION | DESTINATION | CONNECTING NETWORK | COMMUNICATION CATEGORY | COMMUNICATION CHARGE |
|---|---|---|---|---|---|---|
| 1999/10/10 11:11:21 (JST) | 1999/10/10 11:18:45 (JST) | AREA OF MOBILE CARRIER A1 (COUNTRY a) | SUBSCRIBER TERMINAL OF MOBILE CARRIER C1 (COUNTRY a) 080-XXX-XXXX | DOMESTIC CONNECTING CARRIER A1 | OUTGOING CALL | 380 YEN |
| 1999/10/10 12:15:36 (JST) | 1999/10/10 12:19:46 (JST) | AREA OF MOBILE CARRIER A1 (COUNTRY a) | STATIONARY TERMINAL OF STATIONARY CARRIER A1 (COUNTRY a) 045-XXX-XXXX | DOMESTIC CONNECTING CARRIER A1 | INCOMING CALL (COLLECT) | 280 YEN |
| 1999/10/10 12:19:47 (JST) | 1999/10/10 12:22:32 (JST) | AREA OF MOBILE CARRIER A2 (COUNTRY a) | STATIONARY TERMINAL OF STATIONARY CARRIER A1 (COUNTRY a) 045-XXX-XXXX | DOMESTIC CONNECTING CARRIER B1 | INCOMING CALL (COLLECT) | 230 YEN |
| 1999/10/10 14:11:51 (JST) | 1999/10/10 14:18:25 (JST) | AREA OF MOBILE CARRIER A2 (COUNTRY a) | SUBSCRIBER TERMINAL OF MOBILE CARRIER A2 (COUNTRY a) 080-XXX-XXXX | NOT SPECIFIED | OUTGOING CALL (COLLECT) | — |
| 1999/10/11 12:11:31 (GMT) | 1999/10/11 12:18:25 (GMT) | AREA OF MOBILE CARRIER B1 (COUNTRY b) | STATIONARY TERMINAL OF STATIONARY CARRIER A1 (COUNTRY a) 045-XXX-XXXX | — | INCOMING CALL | — |
| 1999/10/11 12:21:41 (GMT) | 1999/10/11 12:28:25 (GMT) | AREA OF MOBILE CARRIER B1 (COUNTRY b) | STATIONARY TERMINAL OF STATIONARY CARRIER A1 (COUNTRY a) 045-XXX-XXXX | DOMESTIC CONNECTING CARRIER C1 INTERNATIONAL CONNECTING CARRIER A1 | OUTGOING CALL | 1200 YEN |

COMMUNICATION APPARATUS

BACKGROUND OF THE INVENTION

1. Field of the Invention

This invention relates to a communication apparatus that is capable of managing communication charges.

2. Description of the Related Art

A roaming service for communication between neighboring zones has been achieved in roaming radio communications systems [the PDC (Personal Digital Cellular) system, PHS (Personal Handyphone System) and GSM (Global System for Mobile communications)]. However, a roaming service on a world-wide scale has not yet been implemented.

A radio communication system capable of roaming on a world-wide scale has recently been developed and is referred to as "IMT 2000" [FPLMTS (Future Public Land Mobile Telecommunication Systems)].

A radio terminal apparatus is now available having a function for storing and managing the communication history of the apparatus by using a caller number. By means such as a service for giving notification of the caller number, it is possible to specify a communicating party on the side of the radio terminal apparatus.

However, the communication-history management function of the conventional radio terminal apparatus is considered to be an extension of the application of the communication-history management function used by a wired terminal apparatus. The main purpose of this function, therefore, is to manage when and with whom communication took place. In other words, no improvement in the management of the communication history of the radio terminal apparatus is provided. Accordingly, the calculation of a communication charge from communication-history information that is possible with a wired terminal apparatus is not possible with a radio (wireless) terminal apparatus.

Information for the purpose of recognizing a communication route (a connecting network intervening between communicating parties) is merely an additional dial number entered when a call is originated. More specifically, in a case where selection of a connecting network is left up to the radio network or a case where a response is made to a collect call, the connecting network cannot be recognized at the radio terminal apparatus. As a result, communication begins without the user of the radio terminal knowing how much the charge will be over a fixed period of time. This can lead to one being billed later for an unexpectedly high communication fee.

SUMMARY OF THE INVENTION

Accordingly, an object of the present invention is to give notification of accurate communication charges.

Another object of the present invention is to make possible the notification of accurate communication charges even if roaming is performed.

A further object of the present invention is to prevent an increase in the amount of data in communication performed at call origination or termination for the purpose of informing of communication charges.

A further object of the present invention is to give notification of the communication charge involved in a collect call.

Still another object of the present invention is to give notification of accurate communication charge that conforms to the route of the connection to the communicating party.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1A is a diagram conceptually illustrating the roaming of a radio terminal apparatus in a wide-band CDMA (W-CDMA) mobile communication system;

FIG. 7 is a diagram showing the content of communication-history information;

DESCRIPTION OF THE PREFERRED EMBODIMENT

A communication system embodying the present invention will now be described.

Illustrated as an example of this communication system is W-CDMA mobile communication system, which is a candidate for an IMT (International Mobile Telecommunication) 2000 system. The latter is a radio communication system contrived for roaming.

FIG. 1A is a diagram conceptually illustrating the roaming of a radio terminal apparatus in a W-CDMA mobile communication system. As shown in FIG. 1A, radio service zones 101, 111 are provided by respective communications carriers. The service zones (service zones A and B) are each composed of a combination of radio cells formed by formed by individual radio base stations, not shown. Each of the radio base stations is controlled by radio channel control units 102, 112 of the respective carriers. A communication network 100 connects the radio channel control units 102, 112.

Figure 1B:
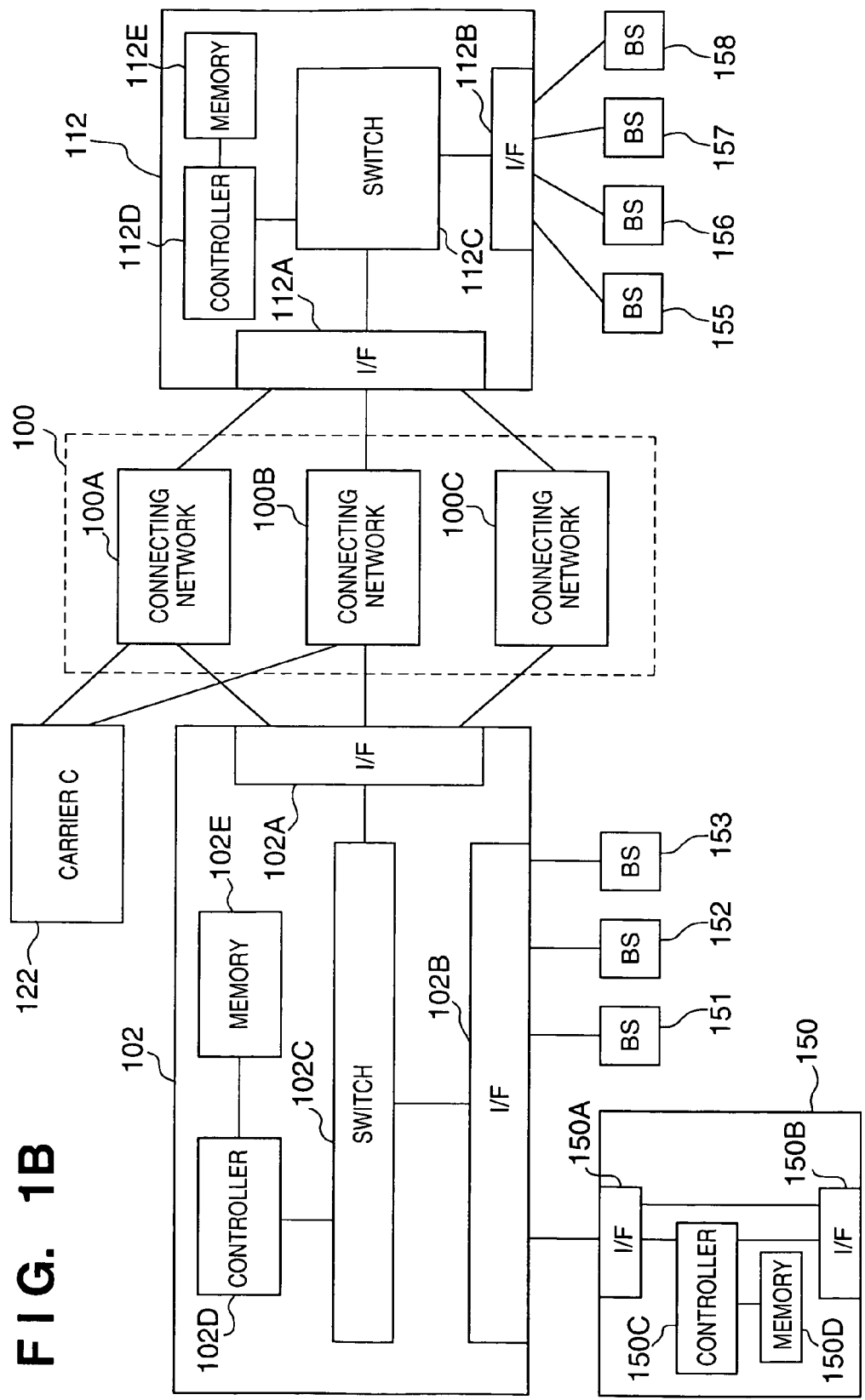
FIG. 1B is a block diagram illustrating the general construction of the mobile communication system shown in FIG. 1A.

FIG. 1B is a block diagram illustrating the mobile radio communication system shown in FIG. 1A.

As shown in FIG. 1B, the radio channel control units 102, 112 are connected by connecting networks 100A, 100B and 100C, which construct the communication network 100 shown in FIG. 1A.

In addition to the radio channel control unit 102 of carrier A from which a radio terminal A103 roams and the radio channel control unit 112 of carrier B into which the radio terminal A103 roams, a radio channel control unit 122 (not shown in FIG. 1A) of a carrier C is connected to the connecting networks 100A and 100B.

The radio channel control units 102, 112 respectively include interfaces 102A, 112A for connecting the communication network 100, interfaces 102B, 112B for connecting radio base stations (BS), switches 102C, 112C for connecting the interfaces 102A, 102B and the interfaces 112A, 112B, controllers 102D, 112D, and memories 102E, 112E.

One of radio base stations BS is indicated at 150. The other radio base stations, indicated at 151 to 153 and at 154 to 158, have the same structure and the radio base station 150.

The radio base station 150 includes an interface 150A for connecting the radio channel control unit 102, an interface 150B for connecting the radio terminal A103 via a radio channel, a controller 150C and a memory 150D.

If the radio terminal A103 registered as a subscriber with the carrier A moves into the service zone 111 controlled by the carrier B, a radio connection becomes possible within the service zone 111, whereby basic service (outgoing and incoming call service) is assured.

The stipulated points of the standardized interfaces are the radio areas and control within the radio areas is unified. However, the line numbers used in order to make outgoing calls in each of the service zones and the connecting network that intervenes in the communication route when a line is connected are quite likely to differ from carrier to carrier owing to the backbone network used, national policy, etc.

For this reason, a terminal user merely obtains communication-history information (the times at which communication started and stopped, information relating to communicating parties, etc.) used as an extension of the conventional wired communication services and is incapable of calculating a communication charge from communication-history information.

In order to improve upon this situation, information is reported as necessary to the radio terminal from the radio network (e.g., the radio channel control unit 112 and the radio base stations BS) controlling the particular radio service zone after authentication processing at connection of the radio channel. This is done so that the roaming terminal can manage communication-history information that makes calculation of communication charges possible.

More specifically, by reporting country information and wireless carrier information (e.g., information identifying the carrier B), which is necessary to identify the zone position of the radio terminal resides, as well as the carrier information (e.g., information identifying the carrier B) and connecting network information (e.g., information identifying connecting networks 10A, 100B and 100C), which is basic information for selecting a connecting network, to the roaming radio terminal, an environment is established in which it is possible for the radio terminal to manage, without placing a burden upon the user thereof, communication-history information through which the communication charge of the roaming terminal can be calculated.

Figure 2:
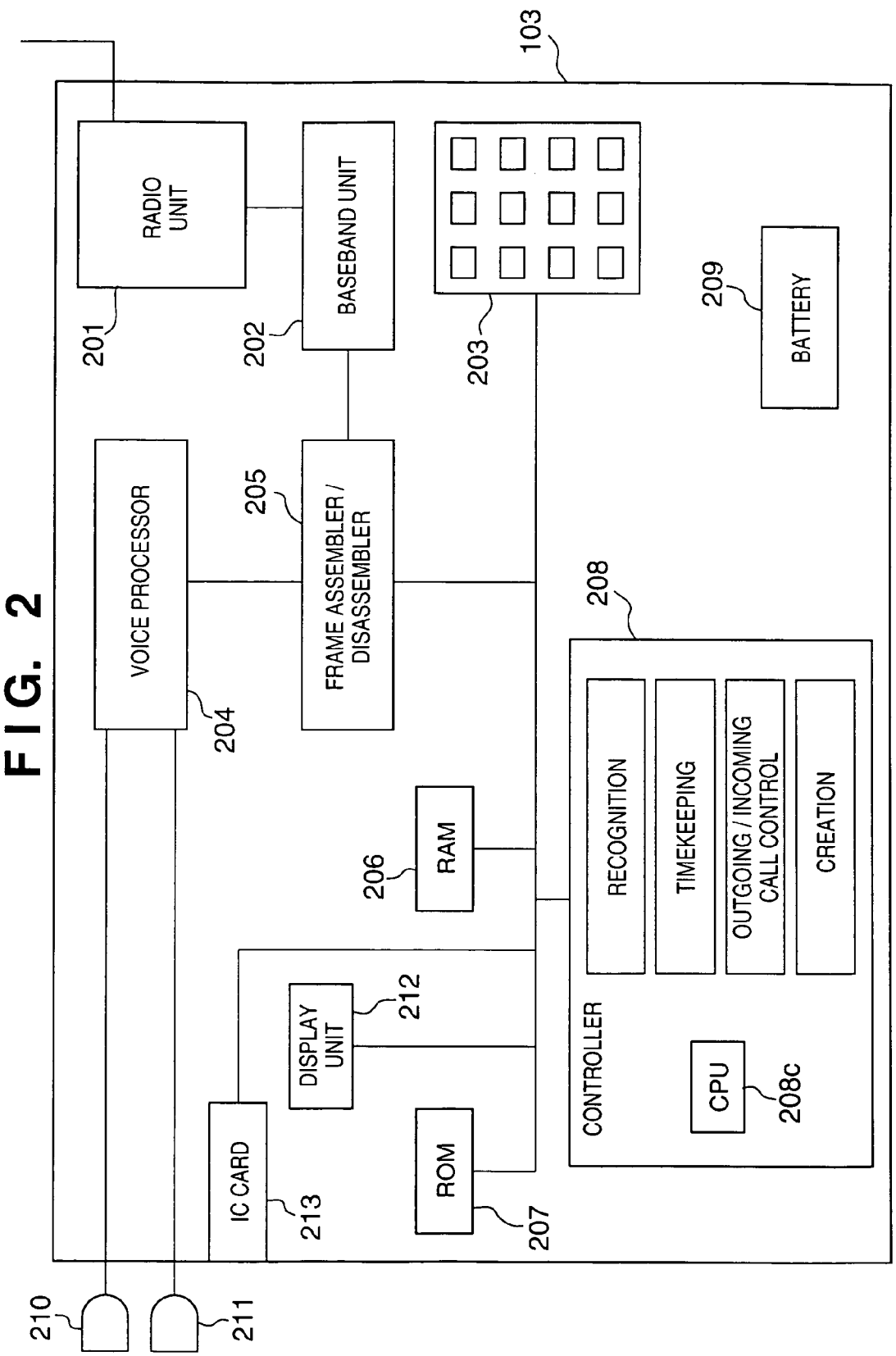
FIG. 2 is a block diagram showing the construction of a radio terminal apparatus.

FIG. 2 is a block diagram illustrating the structure of the radio terminal apparatus 103. The radio terminal apparatus 103 includes a radio unit 201 for performing wireless sending and receiving; a baseband unit 202 for modulating and demodulating data; and a keypad 203 having a send key for making an outgoing call, a plurality of one-touch keys through which line numbers are registered, function keys such as abbreviated dialing keys pressed when abbreviated dialing is selected, and various other operating keys. A variety of information is entered by operating the keypad.

The radio terminal apparatus 103 further includes a voice processor 204 for coding and decoding voice data; a frame assembler/disassembler 205 for assembling and disassembling send/receive data in accordance with a send/receive frame format; a RAM 206 used as a work area in which various data is stored temporarily; a ROM 207 in which a control program and various control data area stored; and a controller 208, which is constituted by a CPU 208C, etc., for controlling the overall apparatus. Functionally speaking, the controller 208 is divided into a recognition section for recognizing in which radio network, from among a plurality of radio networks, the radio terminal apparatus 103 currently resides, a timekeeping section calibrated by input of reference time information, an outgoing/incoming call control section and a creation section for creating communication-history information using various information, which is obtained from the network, as basic information.

The radio terminal apparatus 103 further includes a battery 209 for driving the apparatus, handsets 210, 211, and a display unit 212 for displaying a communication charge per unit time, the line number of a communicating party, etc. Numeral 213 denotes a removable IC card having a memory.

An example in which information relating to user attributes (line number, etc.) and communication-history information is stored in the RAM 206 will be described below, although the information may be stored on the IC card 213 if desired.

[Position Registration Sequence]

Figure 3:
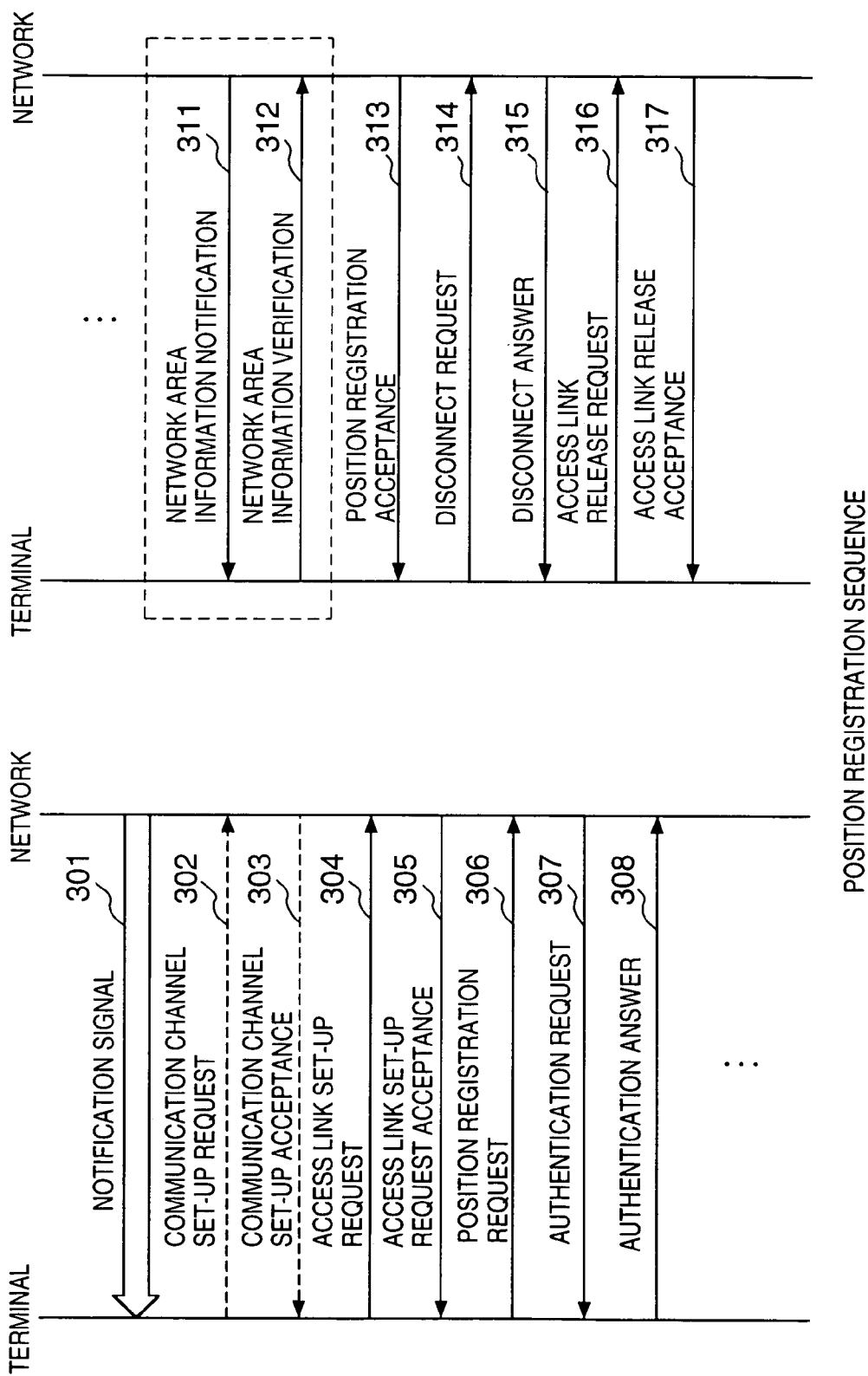
FIG. 3 is a diagram showing a procedure for reporting network area information at execution of a position-registration processing sequence in a W-CDMA mobile communication system.

FIG. 3 is a diagram showing a procedure for reporting network area information at execution of a position-registration processing sequence in a W-CDMA mobile communication system.

In FIG. 3, a base station on the side of the radio network sends a terminal a notification signal 301 to report information (carrier identifying information, base-station identifying information, etc.) concerning the network to which the base station belongs.

In response to activation of the radio terminal or roaming of the radio terminal between radio cells, communication channel set-up (communication channel set-up request 302 and communication channel set-up acceptance) and access link set-up (access link set-up request 304 and access link set-up acceptance 305) is performed, in regard to the radio network transmitting the notification signal, by a trigger from the radio terminal that has recognized the necessity for position registration processing.

The terminal issues a position registration request 306 to the network when an exchange of logical control information has become possible. Upon accepting the request, the network executes authentication processing (authentication request 307 and authentication answer 308) with respect to the terminal, thereby verifying that the terminal is not unauthorized.

Thereafter, information 311 on the side of the network (network area information), namely connecting network identification number information and country information on the network side, is reported to the terminal as necessary (as when the position of this terminal is registered with the network for the first time). After the terminal verifies (312) that network area information has been received normally, the network completes terminal position registration and sends back position registration acceptance (313).

Upon receiving the position registration request 306 via, e.g., the base station 155, the controller 102D of the radio channel control unit 112 determines whether identification information of the radio terminal A103 included in the position registration request 306 has already been registered in the memory 112E. If the identification information of the radio terminal A103 has not yet been registered in the memory 112E, controller 102D stores the identification information of the radio terminal A103 in the memory 112E in association with the identification information of the base station 155 and sends the radio terminal A103 the network information notification 311.

If the identification information of the radio terminal A103 has already been registered in the memory 112E, the controller 112D of the radio channel control unit 112 does not send the terminal the network information notification 311. In a case where the identification information of the radio terminal A103 has been registered in association with a base station other than the base station 155, the identification information of the radio terminal A103 that has been registered in association with the base station other than base station 155 is erased and the identification information of the radio terminal A103 is registered in association with the base station 155.

The radio channel control unit 112 stores the network area information in the memory 112E.

After this exchange of logical information is completed by this procedure and the logical link is severed owing to activation of the terminal (disconnect request 314 and disconnect answer 315), the access link is released (access link release request 316 and access link release acceptance 317), the radio channel is disconnected.

Thus, after processing for verifying authentication at the time of radio channel connection between the network and radio terminal, network area information is reported as necessary.

More specifically, the user of a radio terminal that has come under the control of this radio network because of roaming or some other reason is provided with network area information (connecting network identification number information, country number information, etc.) concerning the network. The connecting network identification number information is information composed of numbers for identifying respective ones of the connecting networks 100A, 100B and 100C. The country number information is the number of the country in which the carrier is present.

The network area information includes information indicating the time in the country in which the carrier is present.

The network area information further includes standard billing information of the carrier. For example, if the radio terminal roams into the zone of carrier B, the network area information will contain information regarding this carrier's billing per unit time.

The network area information further includes the network utilization method, such as the access number system.

Accordingly, the user of this radio terminal is capable of acquiring basic information necessary to create communication-history information in regard to the network area into which the terminal roams.

[Outgoing/Incoming call Sequences]

The foregoing illustrates an example in which network area information is transmitted at activation of the position registration sequence. Illustrated next will be an example in which, after execution of authentication processing in which notification is given during the course of an outgoing-call sequence and incoming-call sequence, network area information is transmitted as necessary from the network side and connecting network information is requested as necessary from the terminal side.

Figure 4:
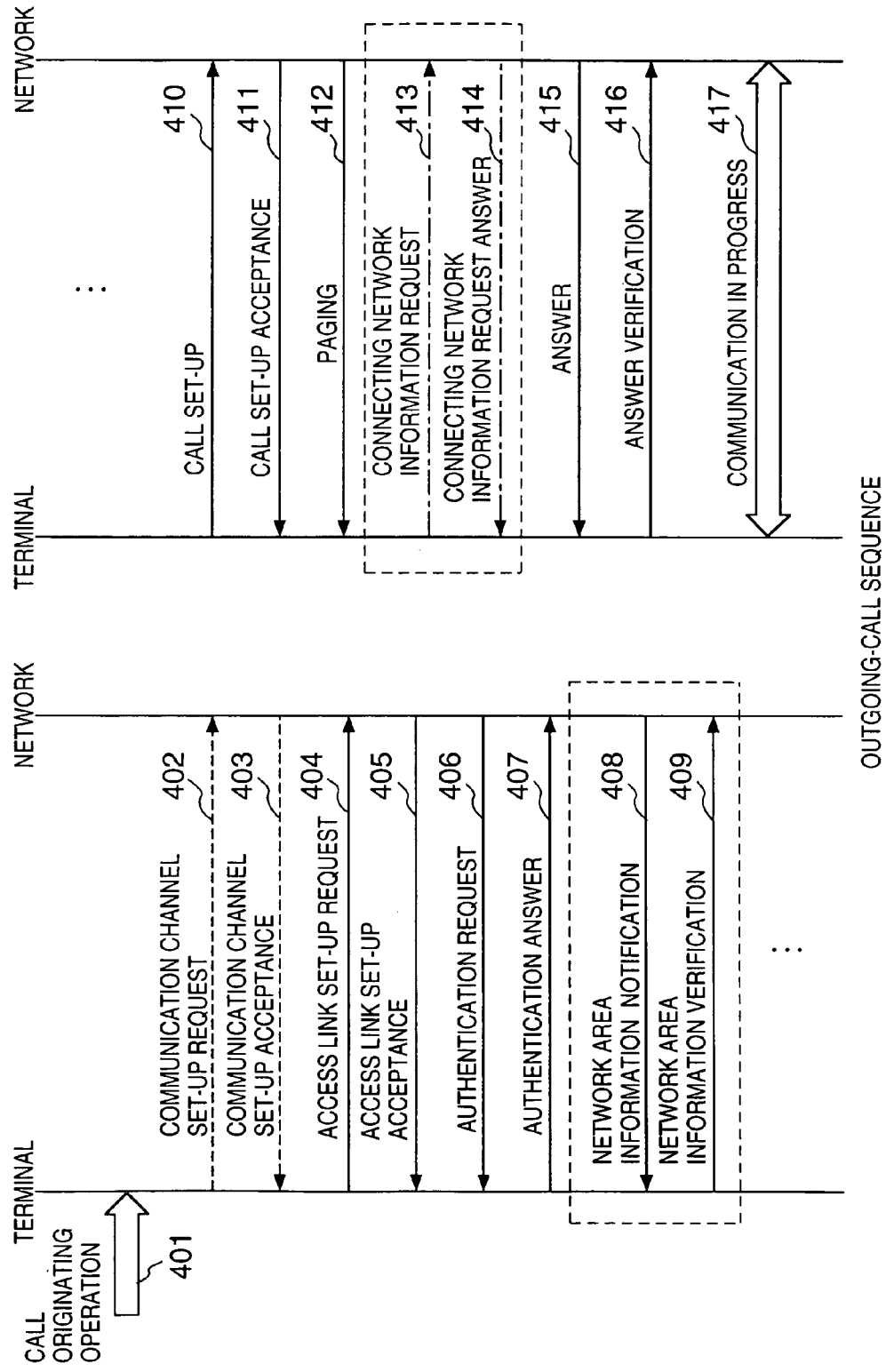
FIG. 4 is a diagram illustrating an outgoing-call sequence.
Figure 5:
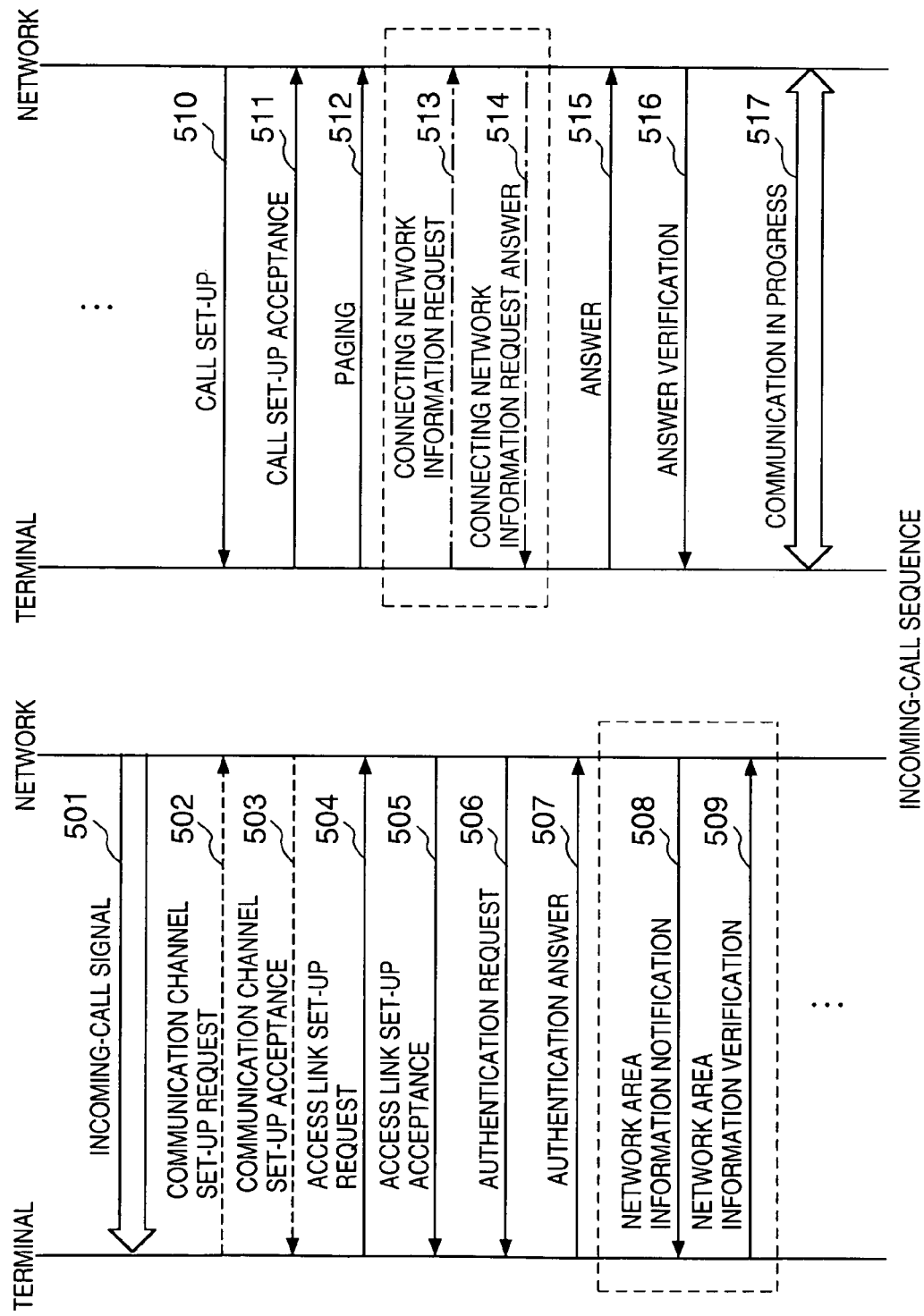
FIG. 5 is a diagram illustrating an incoming-call sequence.

FIG. 4 is a diagram illustrating an outgoing-call sequence, and FIG. 5 is a diagram illustrating an incoming-call sequence.

In the case of an outgoing call, as shown in FIG. 4, an outgoing call operation 401 serves as a trigger to set up a radio channel (communication channel set-up request 402, communication channel set-up acceptance 403, access link set-up request 404 and access link set-up acceptance 405) and execute authentication processing (authentication request 406 and authentication answer 407).

In the case of an incoming call, as shown in FIG. 5, an incoming-call signal 501 arriving at the terminal serves as a trigger to set up a radio channel (communication channel set-up request 502, communication channel set-up acceptance 503, access link set-up request 504 and access link set-up acceptance 505) and execute authentication processing (authentication request 506 and authentication answer 507).

Thereafter, the network side notifies (network area information notification 408, 508) the radio terminal of its own network area information (connecting network identification number information, country number information and network utilization method, such as the access number system) as necessary (as when the network area information is changed on the network side and a radio terminal, whose position was registered before the change, places an outgoing call or receives an incoming call the first time after the change).

In a case where the radio channel control unit 112 stores the identification information of the radio terminal, the position of which has been registered, in the memory 112E and the network area information is changed, it is determined whether notification of the changed network area information has been given to each of the radio terminals whose identification information has been stored in the memory 112E.

After the radio terminal verifies that the network area information has been received normally (network area information verification 409, 509), a call set-up sequence on the outgoing-call side (call set-up 410, call set-up acceptance 411 and paging 412) and a call set-up sequence on the incoming-call side (call set-up 510, call set-up acceptance 511 and paging 512).

Thereafter, it is determined whether connecting network information being used to set-up the communication line is required on the side of the terminal.

In a case where basic information for calculating a communication charge on the side of the radio terminal is inadequate, as when a connecting network selection number has not been added on to the line number at the time of an outgoing call or when an incoming call is a collect call, the terminal requests the network side for connecting network information (connecting network information request 413, 513) and accepts from the network side, in the form of a connecting network information request answer message (connecting network information request answer 414, 514), the connecting network information (connecting network identification information and standard billing information, etc.) being used in the currently set-up route of the communication line. The standard billing information contained in the connecting network information is the charge, per unit time, which the connecting network collects from the user.

For example, if notification of standard billing information has already been received from the connecting network 100A and this information has been stored in the RAM 206, then, when the selection number of the connecting network 100A is added onto the line number and sent with the call, the connecting network information requests 413, 513 will be unnecessary.

It should be noted that the radio channel control unit 112 transmits, via the radio base station, an incoming-call signal onto which has been added data indicating whether the incoming call is a collect call. On the basis of this data, the radio terminal judges whether the received incoming-call signal is a collect call or not.

Thereafter, the communicating party answers (answer 415, answer verification 416) in case of an outgoing call. In the case of an incoming call, the terminal answers (answer 515, answer verification 516). A transition is then made to the communicating state (communication in progress 417, 517) in both cases.

Thus, after processing for verifying authentication at the time of radio channel connection between the network and radio terminal, network area information is reported from the network to the radio terminal as necessary.

More specifically, in addition to a radio terminal that has come under the control of this radio network because of roaming or some other reason, a radio terminal that has already had its position registered prior to a change in the network area information on the network side (a change in the access number system, etc.) is informed of the latest network area information content and method of utilization.

Accordingly, it is possible to prevent a situation in which basic information for creating communication-history information is not the same on both the terminal and network sides.

[Acceptance of Notification of Network Information]

The foregoing illustrates the overall operation of the radio communication system. The processing operation of the radio terminal apparatus will be described next.

Figure 6:
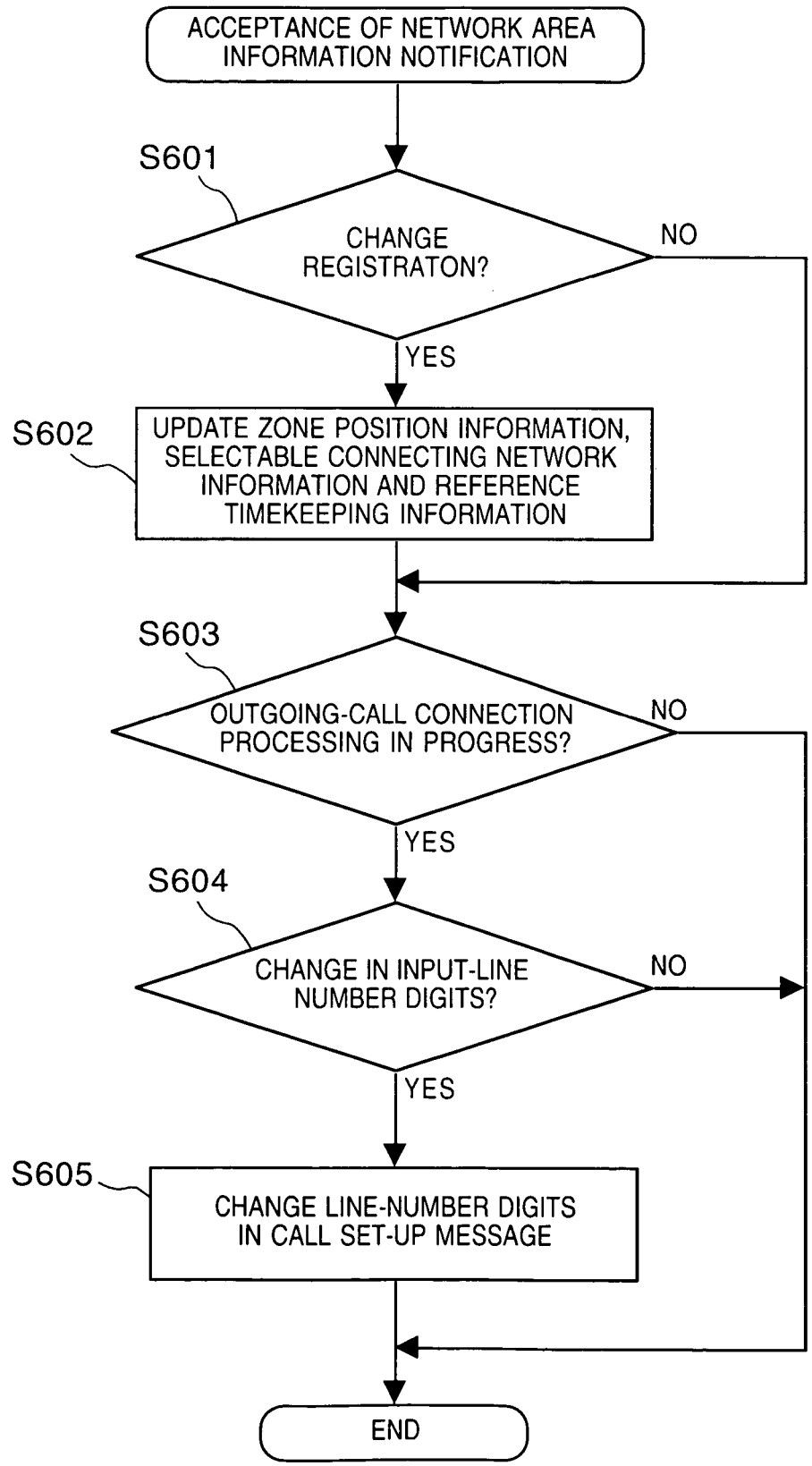
FIG. 6 is a flowchart showing processing for accepting notification of network area information in a radio terminal apparatus activated when network area information is received.

FIG. 6 is a flowchart showing processing for accepting notification of network area information in a radio terminal apparatus activated when network area information is received at the time of position registration, an outgoing call and an incoming call. The processing program is stored in the ROM 207 and is executed by the CPU 208C, which is a microcomputer within the controller 208.

When the network area information has been received (311, 408, 508), first it is determined whether the content of the received network area information (country number information, carrier access number information, area information, etc.) is different from the content that has been registered in the RAM 206 (step S601).

If it is determined that the content has been changed, the zone position information (carrier identification information and country information), selectable connecting network information and reference timekeeping information (time) contained in the received network area information is stored in the RAM 206 (step S602). If it is determined that the content has not been changed, on the other hand, control proceeds to the next step without executing the update processing of step S602. It should be noted that the received network area information may be stored in the RAM 206 if desired regardless of whether the registered content has been changed or not.

When the network area information is received, it is determined whether the radio terminal is currently executing outgoing-call connection processing (step S603). If outgoing-call connection processing has not started, processing for accepting the network area information notification is terminated directly.

In a case where outgoing-call connection processing has started, on the other hand, it is determined (step S604) whether the fact that the digits of the line number entered for the sake of an outgoing call have been changed has been reported by the network area information (408 in FIG. 4). If a change in the number digits is unnecessary, processing for accepting the network area information notification is terminated directly.

If a change is necessary, on the other hand, the destination line-number digits set in the call set-up message are changed to number digits contained in the network area information received at 408 in FIG. 4 (step S605) and processing for accepting network area information notification is terminated.

For example, assume that the selection number of the connecting network 100A prevailing prior to a change is entered and an outgoing-call operation is performed. If the network area information gives notification of the fact that the number for selecting the connecting network 100A has changed, the number for selecting the connecting network is changed to the number of which notification has been given by the network area information.

In a case where the radio channel control unit stores the selection number of the connecting network in the memory 112E before hand and the selection number of this connecting network is changed, network area information indicating that the selection number of the trunk system has changed is reported to the radio terminal.

As a result, the radio terminal, without any operation being performed by the user, is capable of acquiring basic information for creating communication-history information conforming to the network zone that is the destination of roaming.

[Creation of Communication-History Information]

The foregoing illustrates a method of acquiring basic information for creating communication-history information. Described next will be the actual creation of communication-history information.

FIG. 7 is a diagram showing the content of communication-history information that has been stored in the RAM 206. The communication-history information includes communication starting time, communication end time, zone location, destination, connecting network, communication category and communication charge.

Figure 8:
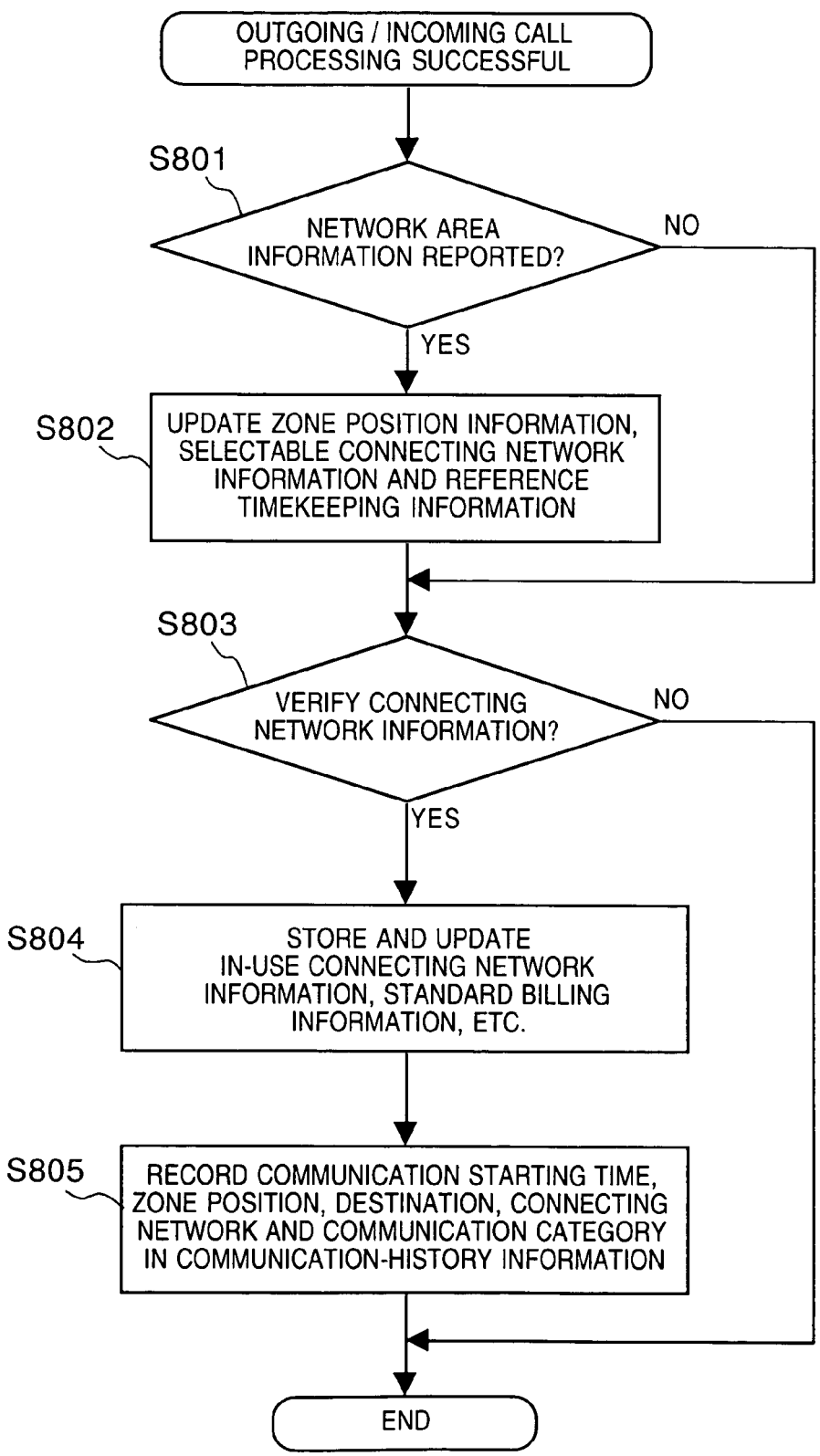
FIG. 8 is a flowchart showing processing at success of outgoing/incoming call processing when various items of communication-history information are stored.

FIG. 8 is a flowchart showing processing at success of outgoing/incoming call processing when various items of communication-history information are stored. The processing program is stored in the ROM 207 and is executed by the CPU 208C within the controller 208. This processing starts in the radio terminal apparatus when processing for an outgoing/incoming call has succeeded.

First, in the outgoing/incoming call sequence, it is determined whether the network side has reported a change in the network area information (network area information notification 408, 508) (step S801). In a case where notification of a change in network area information has been given, the reported basic information (zone position information, selectable connecting network information, reference timekeeping information, standard billing information, etc.) is stored in the RAM 206 (step S802). If a change in network area information has not been reported, the basic information in the RAM 206 is retained as is.

The exchanges between the terminal and network indicated at 410 to 412 in FIG. 4 and at 510 to 512 in FIG. 5 are then carried out.

It is determined whether it is necessary to verify the connecting network information (step S803).

A request for connecting network information is not made in the case of an outgoing call in which the terminal specifies a connecting network for which the basic information (standard billing information, etc.) has already been identified, in the case of an outgoing call based upon a collect call for which a communication charge is not incurred on the terminal side, and in the case of an ordinary (non-collect) incoming call.

If the above is not the case, however, i.e., in the case of an outgoing call in which the connecting network is not specified (that is, in which the selection of the connecting network is left to the radio network) and in the case of an incoming call based upon a collect call, it is determined that verification is required and the request for connecting network information is issued (connecting network information requests 413, 513). The basic information (in-use connecting network information, standard billing information, etc.) that has been stored in the RAM 206 is updated in accordance with the answer information (connecting network information request answer 414, 514) from the network side (step S804).

Here the standard billing information is the charge per unit time which the connecting network being used collects from the user.

It should be noted that the radio channel control unit 112 transmits, via the radio base station, an incoming-call signal that includes data indicating whether the call is a collect call. On the basis of this data, the radio terminal determines whether the incoming-call signal is a collect call.

Further, whether an outgoing call is one that did or did not specify a connecting network is determined by whether a number for specifying the connecting network was entered with a number entered from the keypad 203 for the purpose of placing an outgoing call.

Finally, communication starting time, zone position (carrier+country information), destination (line number of communication party+carrier+country information), connecting network and communication category (outgoing call, incoming call, collect call or not, etc.) are stored in the communication-history information of RAM 206 in accordance with the content of the basic information (step S805) and processing is then terminated.

Figure 9:
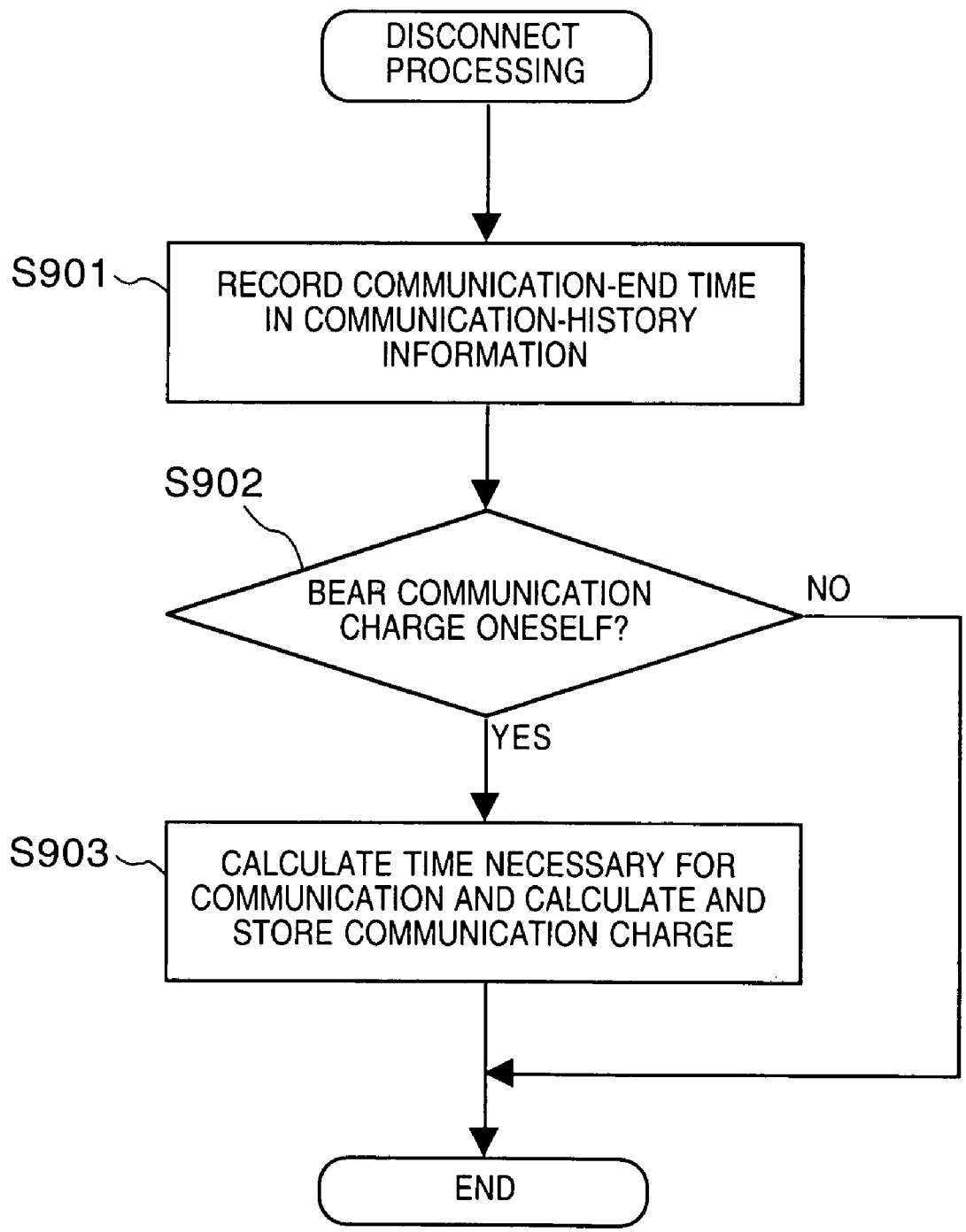
FIG. 9 is a flowchart showing disconnect processing when a communication line is disconnected.

FIG. 9 is a flowchart showing disconnect processing when a communication line is disconnected. The processing program is stored in the ROM 207 and is executed by the CPU 208C within the controller 208.

First, the time at which communication ended is stored in the communication-history information in accordance with the content of the basic information (step S901), then it is determined from the communication category whether the communication charge is to be borne by oneself (step S902).

If the charge is to be borne by oneself, the communication charge is calculated based upon standard billing information, which is being retained as the basic information, after the time that was necessary for communication is calculated, and the calculated communication charge is then stored in the communication-history information (step S903). Processing is then terminated. The communication charge calculated is displayed on the display unit 202.

The standard billing information for calculating the communication charge from the communication time, zone position (carrier+country information), destination (line number of communication party+carrier+country information) and connecting network has been stored in the RAM 206 in advance. The CPU 208C calculates the communication charge by referring to the information stored in RAM 206.

If it is found at step S902 that the communication charge is not to be borne by oneself, processing is terminated directly.

Figure 10:
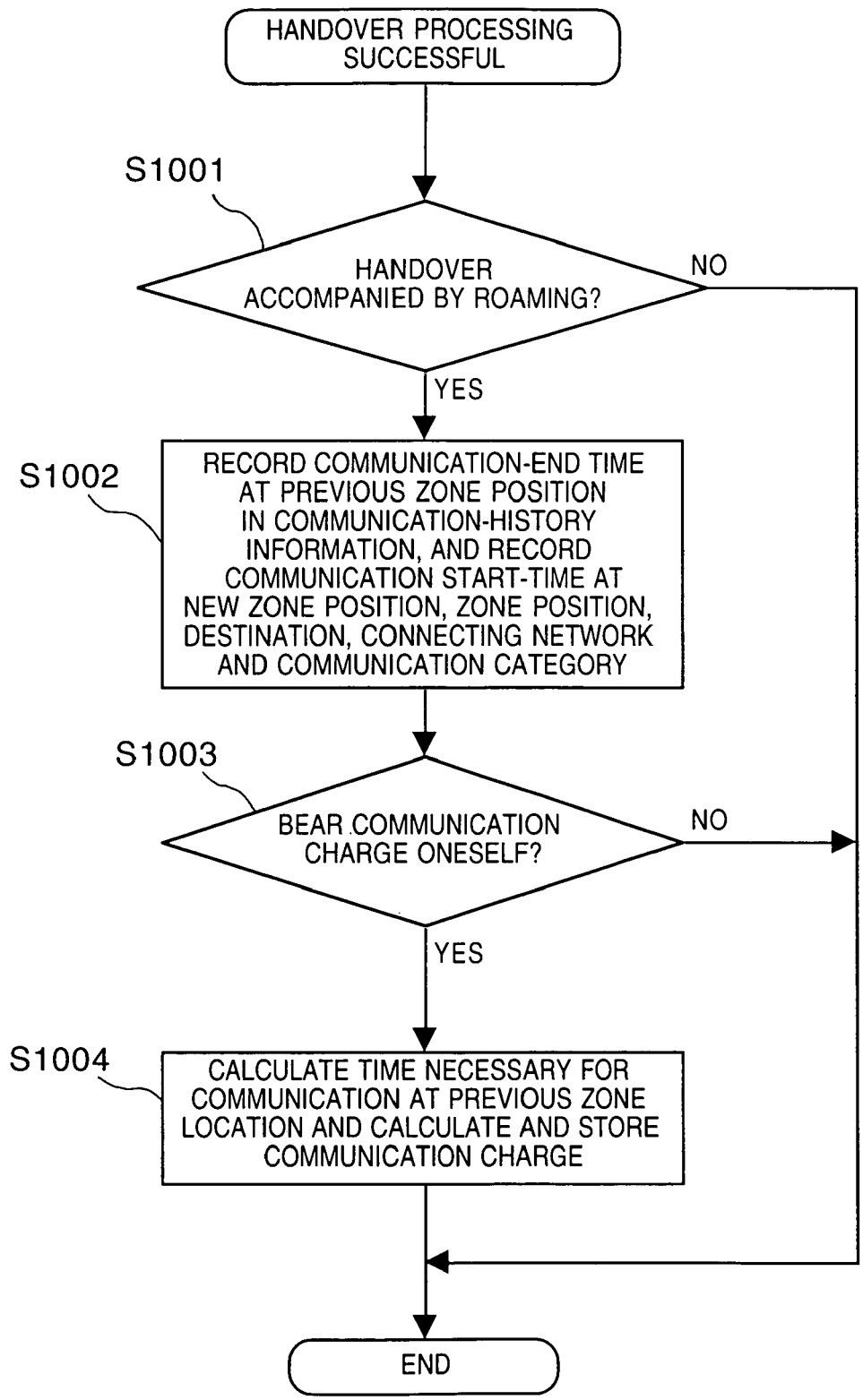
FIG. 10 is a flowchart showing processing at success of handover processing.

FIG. 10 is a flowchart showing processing at success of handover processing. The processing program is stored in the ROM 207 and is executed by the CPU 208C within the controller 208. This processing starts when handover processing has succeeded.

First, it is determined whether handover is accompanied by roaming (step S1001). Handover is a function in which communication is allowed to continue without interruption even when a radio terminal moves from one radio cell to another radio cell during communication. In case of handover not accompanied by roaming, processing is terminated directly. It should be noted that handover not accompanied by roaming refers to a case where the radio terminal moves from one cell to another within a service zone provided by a single carrier.

In case of handover accompanied by roaming, i.e., in a case where the carrier to which the radio terminal is connected before handover is different from that after handover, communication end time at the previous zone position of the terminal is recorded in the communication-history information. Concurrently, communication start time at the new zone position of the terminal, the zone position (carrier+country information), destination (line number of the communicating party+carrier+country information), connecting network, communication category (outgoing call, incoming call, collect call or not) are stored in the communication-history information (step S1002). The new zone position (carrier+country information) and the connecting network is reported from the network into which the radio terminal roamed.

It is determined from the communication category whether the communication charge is to be borne by oneself (step S1003). If the charge is to be borne by oneself, the communication charge is calculated based upon standard billing information, which is being retained as the basic information, and the communication time, zone position (carrier+country information), destination (carrier line number+carrier+country information) and connecting network, after the time that was necessary for communication at the previous position is calculated, and the calculated communication charge is then stored in the communication-history information that prevailed at the previous zone position (step S1004). Processing is then terminated. If the charge is not to be borne by oneself, then processing is terminated directly.

Thus, management of communication charges on the side of the radio terminal apparatus can be achieved by managing communication-history information even in a case where handover is performed.

[Incoming Collect Call]

The foregoing illustrates a method of acquiring basic information for creating communication-history information as well as an example of creation of the communication-history information. Described next will be processing for when an incoming call that is a collect call is received.

Figure 11:
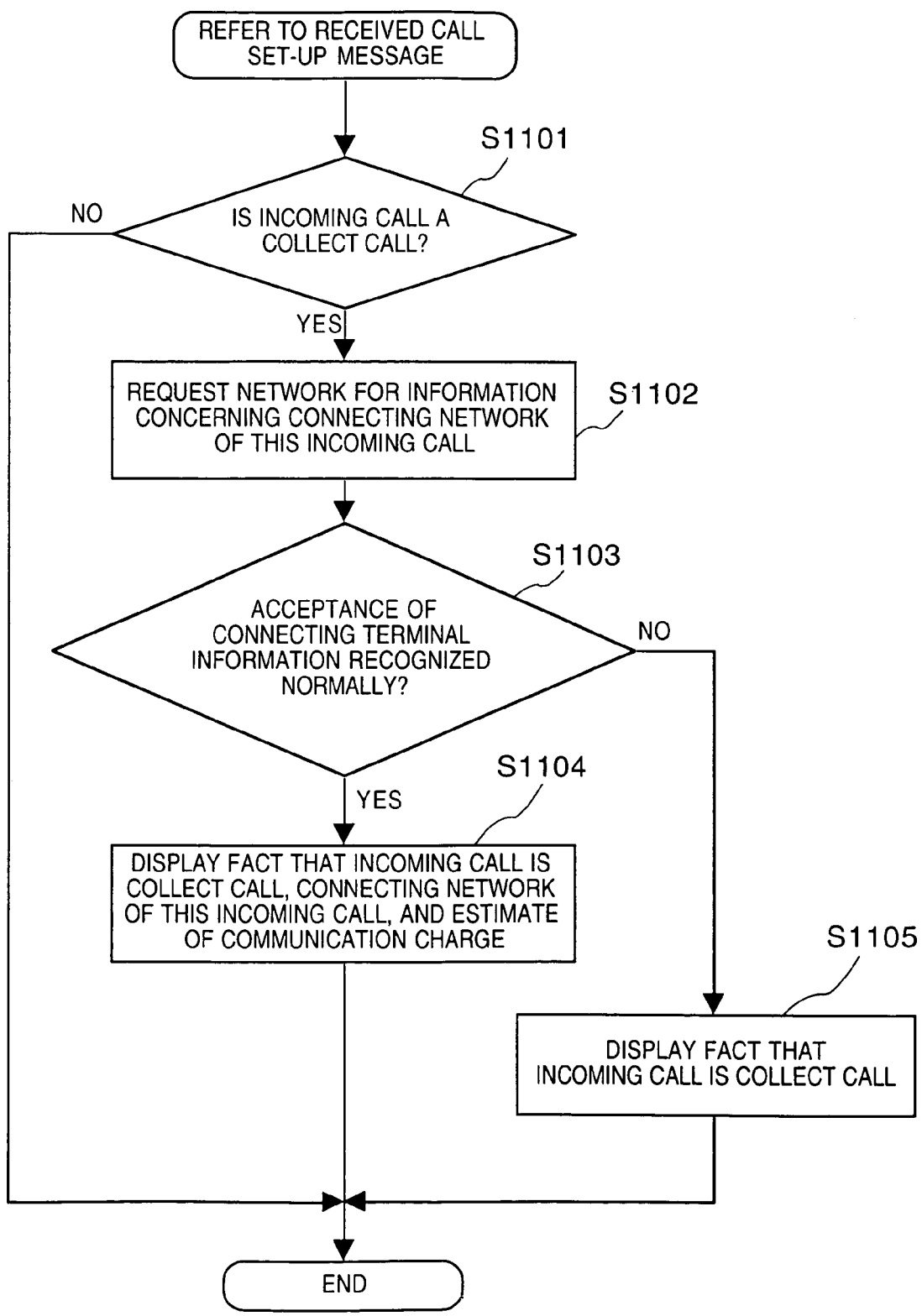
FIG. 11 is a flowchart showing processing for referring to a received call set-up message in a case where a collect call is accepted.

FIG. 11 is a flowchart showing processing for referring to a received call set-up message in a case where an incoming collect call is accepted. The processing program is stored in the ROM 207 and is executed by the CPU 208C, which is a microcomputer within the controller 208. This processing starts when a call set-up message has been received.

In the case of a collect call, the radio base station transmits a call set-up message (the incoming-call signal 501 in FIG. 5) that includes data indicative of the collect call.

The terminal refers to the call set-up message that accompanies the incoming call and determines whether the incoming call is a collect call (step S1101). If the call is not a collect call, processing is terminated directly. If the call is a collect call, the network is requested for the basic information concerning the connecting network used in this incoming call (step S1102; 513 in FIG. 5).

It is determined whether the connecting network information acceptance message (514 in FIG. 5) that is in response to this request could be recognized normally (step S1103). If the message could be recognized normally, the fact that the incoming call is a collect call, the connecting network of this incoming call and a communication charge estimate per unit time are stored in the RAM 206 (the communication-history information of FIG. 7). The connecting networks of this incoming call and the communication charge estimate per unit time are capable of being stored on the IC card 213. If the message could not be recognized normally, on the other hand, the fact that the incoming call is a collect call is displayed on the display unit 212 (step S1105). Processing is then terminated.

As a result, the user of the radio terminal apparatus is capable of recognizing that an incoming call is a collect call and of ascertaining a summary of the communication cost before performing an answering operation.

Thus, with the above-described radio communication apparatus, as illustrated above, a radio network reports radio network information to a radio communication terminal as necessary after execution of processing for authentication performed between the radio network and the radio communication terminal when a radio channel is connected between the network and terminal.

A radio communication terminal that has come under control of a new radio network as a result of roaming or the like recognizes information concerning this radio network (connecting network identification information, country information, reference timekeeping information, standard billing information, etc.) autonomously and temporarily stores this information temporarily as basic information for communication-history information.

When set-up of a communication line has been completed, the radio communication terminal requests the network for information relating to the connecting network, as a result of which information concerning the connecting network (connecting network identification information, billing information, etc.) is recognized autonomously and stored temporarily as basic information for history information.

When the communication-history information is stored, information such as time, zone position, connecting network used and communication charge calculated based upon the basic information also is stored, thereby implementing communication charge management on the side of the radio terminal based upon the communication-history information.

Further, information as to whether an incoming call is a collect call is added onto the call set-up message from the side of the network when an incoming call arrives.

The radio communication terminal senses whether the communication charge of an incoming call is to be borne by the terminal. If the charge is to be borne, the radio terminal queries the network for the information concerning the connecting network of the incoming call before answering, calculates the per-unit-time communication charge of the incoming call based upon the information concerning the connecting network and displays the charge on a display unit. As a result, before the radio terminal answers the incoming call, it is possible for the radio terminal to ascertain a summary of the per-unit-time communication cost of the incoming call.

When selection of a connecting network is left to the radio network, the radio network is queried for information concerning the connecting network of an outgoing call after a communication line is set up (i.e., after a paging message is received from the radio network), the per-unit-time communication charge of the outgoing call is calculated from the information concerning the connecting network, and the charge is displayed on the display unit.

A communication charge calculated based upon a per-unit-time communication charge for each call is stored with the communication-history information, thereby making it possible to implement management of communication charges on the side of the radio terminal based upon more detailed communication-history information.

The example illustrated in the foregoing embodiment is that of a W-CDMA mobile communication system, which is a candidate for an IMT (International Mobile Telecommunication) 2000 system that is a radio communication system contrived for roaming. However, the present invention is effective also in a case where communication-history information is managed in a system (a narrow-band CDMA mobile communication system, GSM, PDC, etc.) that presumes a roaming connection.

In the foregoing embodiment, the communication-history information may be stored on the IC card 213 or in the RAM 206 storing the user information (line number, etc.).

The content of communication-history information that has been stored on the removable IC card 213 having a memory or in the RAM 206 can be viewed by an operation which the user performs using the keypad 203. When the operation to view the information is performed, a password may be entered beforehand to assure that privacy is protected.

It goes without saying that the invention is applicable also to a case where the object of the invention is attained by supplying a radio terminal with a program. In such case it would be possible for the storage medium storing the program represented by software for achieving the present invention to be read out to a system or apparatus, whereby the system or apparatus would manifest the effects of the invention.

Figure 12:
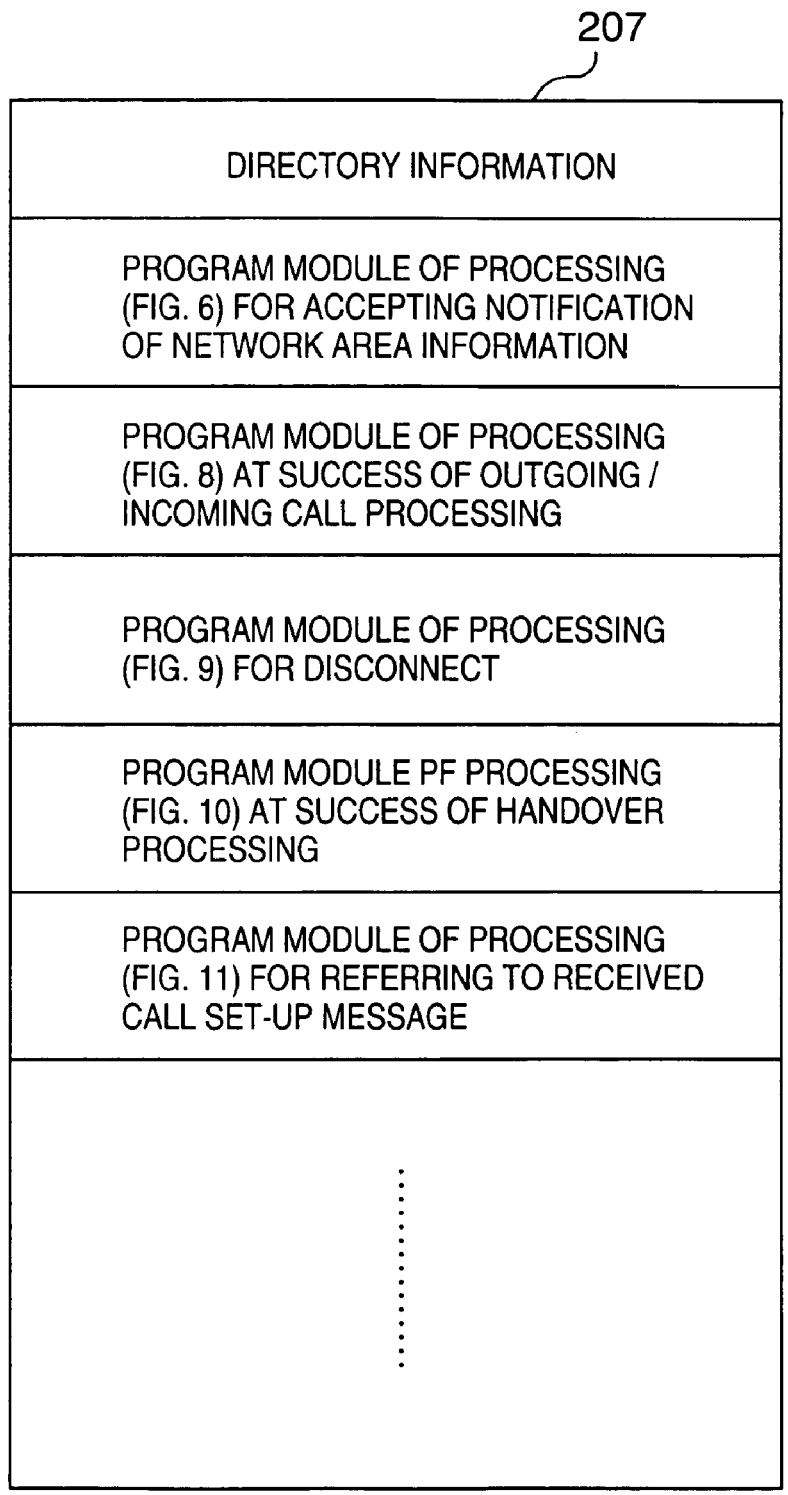
FIG. 12 is a diagram showing a memory map of a ROM serving as a storage medium.

FIG. 12 is a diagram showing a memory map of the ROM 207 serving as the storage medium. The ROM 207 stores a module indicated by the flowchart of FIG. 6, namely the module of a processing program for accepting notification of network area information, a module indicated by the flowchart of FIG. 8, namely the module of a processing program for processing at success of outgoing/incoming call processing, a module indicated by the flowchart of FIG. 9, namely the module of a disconnect processing program, a module indicated by the flowchart of FIG. 10, namely the module of a processing program for processing at success of handover processing, and a module indicated by the flowchart of FIG. 11, namely the module of a processing program for referring to a received call set-up message.

Further, the storage medium supplying the program modules is not limited to a ROM but can be a floppy disk, hard disk, optical disk, magneto-optical disk, CD-ROM, CD-R, DVD, magnetic tape or non-volatile type memory card.

It goes without saying that the present invention further covers a case where, after the program codes read from the storage medium are written in a function expansion board inserted into the computer or in a memory provided in a function extension unit connected to the computer, a CPU or the like contained in the function expansion board or function expansion unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A mobile radio terminal comprising:
   receiving means for receiving data related to a communication charge from a first carrier;
   calculating means for calculating the communication charge for the first carrier in accordance with the data received by said receiving means;
   switching means for switching from the first carrier to a second carrier during communication in the first carrier; and
   storing means for storing the communication charge calculated by said calculating means, wherein the communication charge is based on the time until the first carrier is switched to the second carrier after the communication is started.

2. The terminal according to claim 1, wherein said storing means stores communication start time for the second carrier.

3. A method for a mobile radio terminal, the method comprising the steps of:
   receiving data related to a communication charge from a first carrier;
   calculating the communication charge for the first carrier in the mobile radio terminal in accordance with the data received in said receiving step;
   switching from the first carrier to a second carrier during communication in the first carrier; and
   storing, in the mobile radio terminal, the communication charge calculated by said calculating step, wherein the communication charge is based on the time until the first carrier is switched to the second carrier after the communication is started.

4. The method according to claim 3, wherein said storing step stores communication start time for the second carrier.

5. A memory for storing a program for a mobile radio terminal, the program comprising the steps of:
   receiving data related to a communication charge from a first carrier;
   calculating the communication charge for the first carrier in the mobile radio terminal in accordance with the data received in said receiving step;
   switching from the first carrier to a second carrier during communication in the first carrier; and
   storing, in the mobile radio terminal, the communication charge calculated by said calculating step, wherein the communication charge is based on the time until the first carrier is switched to the second carrier after the communication is started.

6. The memory according to claim 5, wherein said storing step further stores communication start time for the second carrier when the first carrier is switched to the second carrier.

* * * * *